United States Patent
Cox

(10) Patent No.: US 9,286,445 B2
(45) Date of Patent: Mar. 15, 2016

(54) RIGHTS MANAGEMENT SYSTEM

(75) Inventor: Alan Cox, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 1311 days.

(21) Appl. No.: 10/740,391

(22) Filed: Dec. 18, 2003

(65) Prior Publication Data

US 2005/0138406 A1 Jun. 23, 2005

(51) Int. Cl.
*G06F 21/00* (2013.01)
*G06F 21/10* (2013.01)

(52) U.S. Cl.
CPC .............. *G06F 21/10* (2013.01); *G06F 21/105* (2013.01)

(58) Field of Classification Search
None
See application file for complete search history.

(56) References Cited

U.S. PATENT DOCUMENTS

| | | | | |
|---|---|---|---|---|
| 5,375,206 A * | 12/1994 | Hunter et al. | ................. | 717/176 |
| 5,553,239 A | 9/1996 | Heath et al. | | |
| 5,652,890 A * | 7/1997 | Foster et al. | ................. | 713/323 |
| 5,717,604 A * | 2/1998 | Wiggins | ........................ | 709/229 |
| 5,828,876 A | 10/1998 | Fish et al. | | |
| 5,940,504 A * | 8/1999 | Griswold | ........................ | 705/59 |
| 5,974,549 A | 10/1999 | Golan et al. | | |
| 5,987,601 A * | 11/1999 | Donovan | ........................ | 712/244 |
| 6,006,332 A * | 12/1999 | Rabne et al. | ........................ | 726/6 |
| 6,044,471 A | 3/2000 | Colvin | | |
| 6,304,981 B1 * | 10/2001 | Spears et al. | ..................... | 714/24 |
| 6,334,118 B1 * | 12/2001 | Benson | ............................ | 705/52 |
| 6,651,169 B1 * | 11/2003 | Benson et al. | ................ | 713/193 |
| 6,763,458 B1 * | 7/2004 | Watanabe et al. | ............. | 713/100 |
| 7,089,429 B2 * | 8/2006 | Gustafsson | ...................... | 726/26 |
| 7,127,442 B2 * | 10/2006 | Mazza et al. | ..................... | 706/59 |
| 7,212,980 B2 * | 5/2007 | Nakamura et al. | ................ | 705/1 |
| 7,620,950 B2 * | 11/2009 | Mathias et al. | ............... | 718/100 |
| 2001/0011253 A1 | 8/2001 | Coley et al. | | |
| 2002/0013909 A1 * | 1/2002 | Baumeister et al. | .......... | 713/201 |
| 2002/0029347 A1 | 3/2002 | Edelman | | |
| 2002/0071557 A1 * | 6/2002 | Nguyen | ........................ | 380/251 |
| 2002/0120578 A1 * | 8/2002 | Sy | .................................. | 705/59 |
| 2002/0120871 A1 | 8/2002 | Watkins et al. | | |
| 2002/0141593 A1 * | 10/2002 | Kurn et al. | ..................... | 380/286 |
| 2002/0157002 A1 * | 10/2002 | Messerges et al. | ........... | 713/155 |
| 2002/0161718 A1 * | 10/2002 | Coley et al. | ..................... | 705/59 |
| 2003/0167418 A1 * | 9/2003 | Zhu et al. | .......................... | 714/4 |
| 2004/0054923 A1 * | 3/2004 | Seago et al. | .................. | 713/201 |
| 2004/0133793 A1 * | 7/2004 | Ginter et al. | .................. | 713/193 |
| 2004/0187014 A1 * | 9/2004 | Molaro | ......................... | 713/200 |
| 2004/0243708 A1 * | 12/2004 | Stebbings | ..................... | 709/225 |

(Continued)

OTHER PUBLICATIONS

Adams, Steve. Oct. 1999. *Oracle8i Internal Services: for Waits, Latches, Locks, and Memory.* O'Reilly & Associates, Inc. Sebastopool, California.

(Continued)

*Primary Examiner* — Jeffery Williams
(74) *Attorney, Agent, or Firm* — Wilmer Cutler Pickering Hale and Dorr LLP

(57) ABSTRACT

A rights management system monitors and controls use of a computer program to prevent use that is not in compliance with acceptable terms. The system monitors usage of the computer program for usage and activities that are not in compliance with the license or other use terms. Upon detection of a violation of these terms, state information pertaining to the computer program is saved and operation of the computer program and/or a portion of the computer system is suspended. The system maintains the suspension for as long as the violation exists. Once compliance has been reestablished, the suspension is terminated.

20 Claims, 4 Drawing Sheets

(56) References Cited

U.S. PATENT DOCUMENTS

| | | | |
|---|---|---|---|
| 2005/0015218 A1* | 1/2005 | Levi et al. | 702/186 |
| 2005/0049973 A1* | 3/2005 | Read et al. | 705/59 |
| 2005/0188228 A1* | 8/2005 | DeMello et al. | 713/201 |
| 2006/0021065 A1* | 1/2006 | Kamperman et al. | 726/28 |
| 2006/0272030 A1* | 11/2006 | Slemmer et al. | 726/27 |
| 2007/0079381 A1* | 4/2007 | Hartung et al. | 726/26 |
| 2007/0136817 A1* | 6/2007 | Nguyen | 726/26 |

OTHER PUBLICATIONS

Shah, Jay. 1991. "VAXclusters and Other High-Availability Systems." *VAXclusters: Architecture, Programming and Management.* McGraw-Hill, Inc. p. 57-99.

Kenah, Lawrence J. et al. 1984. "VAX/VMS Lock Manager." *VAX/VMS Internals and Data Structures.* Digital Press. p. 244-263.

Supplementary Search Report from European Patent Application No. 04814582.5 mailed Jul. 13, 2009.

* cited by examiner

RIGHTS MANAGEMENT SYSTEM

FIELD OF THE INVENTION

This invention relates to techniques for use in controlling the utilization of computer software and, more particularly, to techniques for preserving information and data when usage of the software fails to comply with previously accepted license terms.

BACKGROUND OF THE INVENTION

Software licensing has historically been based on a "trust" or "rights" model in which the user (e.g., a licensee) is presumed to be honest and trustworthy and willing to abide by the terms of a software license. Under the trust model, these licenses typically accompany a software product to explain the terms of use. For instance, the software license might dictate that the program code is to be installed on only one computer or that it is to be used until a predetermined license expiration date, at which time the license may be renewed.

Unfortunately, enforcing these types of licenses can be difficult in certain situations. For example, users may, purposefully or inadvertently, continue to use the software after the expiration of the license. Software vendors have had difficulty monitoring these types of abuses because they occur in the privacy of the home or company.

One technique that has been developed to address these problems includes implementing a "trust" or "rights" management system onto the computers for purposes of monitoring the manner in which the software is used. These rights management systems may take a wide variety of forms. For example, software components included with the licensed software, or hardware directed by the software, may be implemented to police the software and computer system for compliance with the license terms. Once a violation has been detected (e.g., a user attempts to use the software after the license expiration date), these rights management systems act to disable or terminate use of the software, oftentimes shutting down or restarting the entire computer system.

While these conventional rights management systems have proven effective in preventing unauthorized use of software, they also result in the detrimental loss of data in many situations. For example, upon expiration of a license term, a conventional rights management system may restart or shut down a computer system causing any unsaved data to be lost. While losing data associated with a music player or computer game may be annoying, it does little overall harm to the user. In contrast, the expiry and termination of an operating system may cause serious data loss when the system is terminated. As a result, the usefulness of these conventional rights management systems may be outweighed by the damage caused during their utilization.

SUMMARY OF THE INVENTION

The present invention provides a technique for preventing the unauthorized use of a computer application, operating system, or other program without causing the loss of any information or data. Specifically, the technique of the present invention monitors a computer program for use that is not in compliance with acceptable terms. These terms may be defined, for example, through the use of a license agreement between the computer program provider and the user. When unauthorized use of the computer program is detected, any information and data is saved and the computer program and/or a portion of the computer system is disabled. The specifics concerning data that is saved may be determined, for example, by the computer program vendor or the user upon installation of the computer program. Similarly, a conventional "suspend to disc" operation may be utilized. The suspension of the computer program and/or a portion of the system may be maintained for as long as the violation exists, thereby permitting the user to, for example, renew any expired license terms. Once compliance has been reestablished, suspension of the computer program and/or a portion of the system is terminated and activities resumed. In situations where compliance is not reestablished, the data may be transferred to the user.

DETAILED DESCRIPTION OF EMBODIMENTS OF THE PRESENT INVENTION

The present invention provides a technique for controlling use of a computer program that involves saving any information or data when activities not in compliance with acceptable use terms are detected. By doing so, vital information and data may be preserved. The following description provides one example of an implementation of the technique of the present invention.

Figure 1:
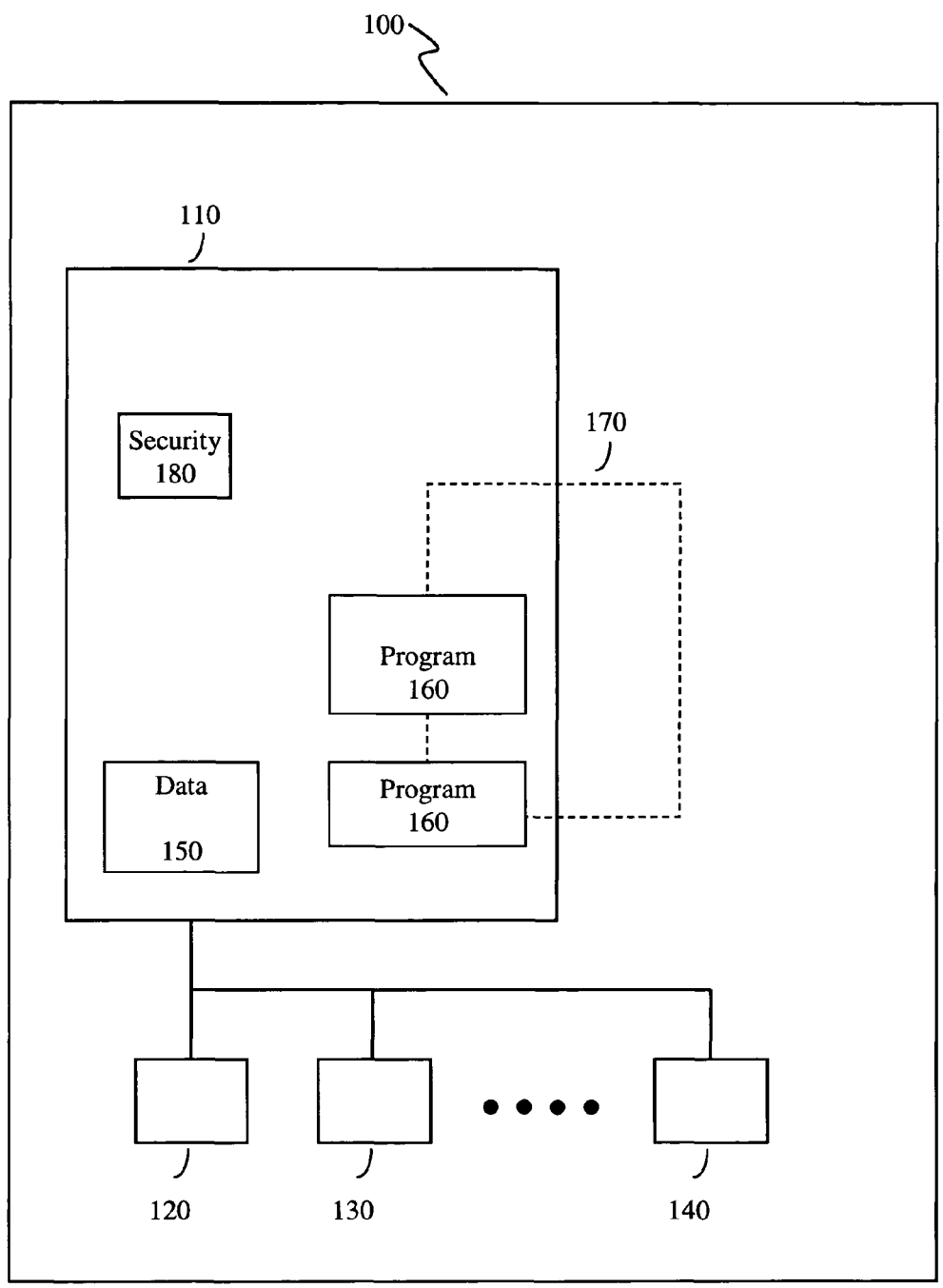
FIG. 1 is a block diagram illustrating an example of a computer system utilizable for implementing a rights management system of the present invention.

FIG. 1 is a block diagram illustrating an example of a computing system 100 utilizable for implementing a rights management system of the present invention. As shown in FIG. 1, system 100 includes a memory device 110, a processing unit 120, interfaces to input/output devices 130, and any other components 140 possessed by computing systems (e.g., displays, peripherals, etc.). Examples of computing system 100 include any of a number of different types of personal computers, laptop computers, personal digital assistants, or cellular telephones, etc., including those having Pentium based processors and systems utilizing operating systems such as Windows NT, MacOS, Unix, or Linux.

Memory device 110 includes, for example, any type of permanent or semi-permanent storage (e.g., hard disc drives, memory cards, and the like). As shown in FIG. 1, memory device 110 may be used to store any number of data files 150 and/or software programs 160 (e.g., systems and/or applications software). In addition, as will be discussed below, in some embodiments of the present invention a security component 180 (e.g., security software) also may be stored in memory device 110.

In addition to the components described above, computing system 100 includes one or more rights management components 170. As will be described in greater detail below, rights management components 170 are utilized to monitor and control use of computer programs 160. Rights management components 170 are 'trusted' from the perspective of, for example, a software vendor or licensor, and in the sense that they prevent unauthorized use of computer programs 160

(e.g., use that is not in compliance with license terms). Rights management components 170 may include any of software, BIOS routines, hardware, etc. (or combinations thereof).

For instance, with embodiments of the present invention that utilize software forms of rights management components, the rights management components may be included and installed as a component of computer program 160. With embodiments of the present invention that utilize hardware forms of rights management components, the rights management components may be activated during installation and execution of computer program 160 (discussed below).

In accordance with the concepts of the present invention, rights management components 170 control and prevent unauthorized use of programs 160 by monitoring for activities or use of programs 160 that are not in compliance with the program license terms (i.e., license terms associated with program 160). Upon discovery of such use, rights management components 170 save or store any state information of the corresponding computer program. For instance, upon expiration of a license, rights management component 170 may save the program data of a word processing program to data area 150. Once the state information has been saved, rights management components 170 terminate execution of or disable the program. After the violating use has been returned to compliance levels, the computer program may be released from suspension, along with any saved state information. In other instances, the state information may be released to a user without, for example, renewing an expired license. In these embodiments, the user's data is returned to the user without permitting use of the computer program. Thus, the saved state information allows, for example, any settings of the computer program to be restored.

Figure 2:
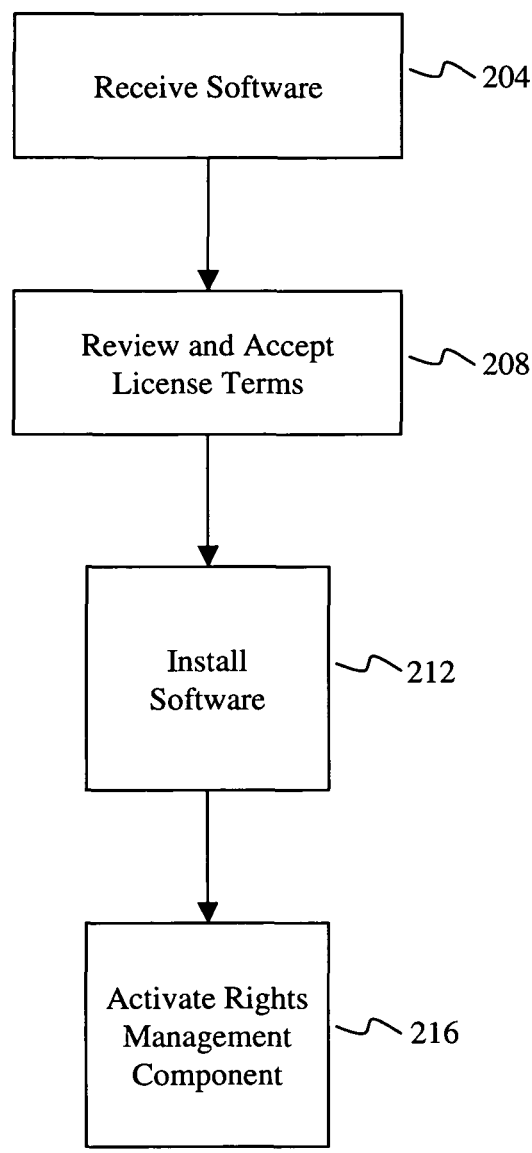
FIG. 2 depicts one example of a process utilizable for implementing a software program and the rights management system of the present invention.

Referring now to FIG. 2, one example of a process utilizable for implementing the rights management system of the present invention is depicted. Initially, a user receives a copy of computer program 160 (e.g., any conventional software program), the use of which is to be managed by the rights management feature of the present invention (STEP 204). As is normally the case, upon receipt of computer program 160, license terms are presented to the user for review. For example, the terms may dictate the duration of the license, which upon expiration may require the renewal of the license, or the terms may dictate a total number of hours of licensed use. If acceptable, the user accepts the license terms (STEP 208) by, for example, clicking an ACCEPT button presented on a display screen. In other cases, for example with shrink wrap licenses, the user may accept the license terms simply by breaking the seal of the package or disc container. Whatever the case, after accepting the license terms, the user may install computer program 160 on computing system 100 using, for example, any known or conventional procedures (STEP 212). Installing the computer program also results in the activation of rights management component 170 of the present invention (STEP 216). For example, if rights management component 170 is embodied in software, it may be provided and installed with the other components of the computer program. If rights management component 170 is embodied in hardware, a component of computer program 160 (e.g., a subroutine and the like), after execution or installation, may define the terms of acceptable use and direct the rights management component to begin monitoring for use within those terms. For instance, computer program 160 may inform rights management component 170 that the license terms are set to expire in twelve months. In response, rights management component 170 begins monitoring, for example, computer program 160 and/or computing system 100 for uses that are not in compliance with the license terms agreed to in STEP 208 (e.g., use of the computer program after the twelve month license term).

Figure 3:
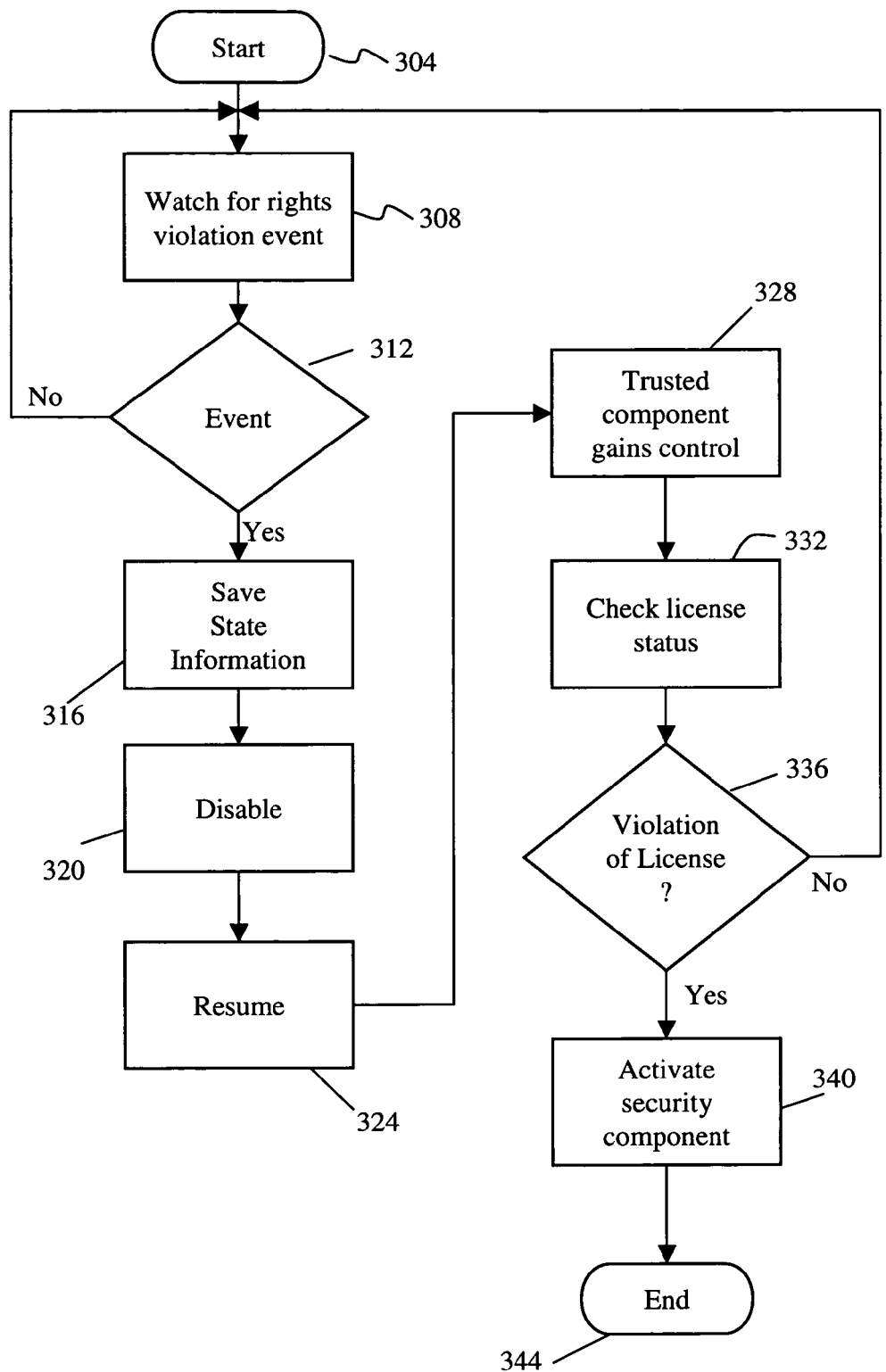
FIG. 3 depicts one example of a process utilizable for controlling operation of the rights management system of the present invention.

Referring now to FIG. 3, one example of a process utilizable for controlling operation of the rights management system of the present invention is depicted. The rights management system starts processing (STEP 304) by monitoring computer program 160, and/or computing system 100 for rights violation events (STEP 308). For example, rights management component 170 may monitor for the use of computer program 160 beyond the term of the license. Similarly, it may monitor for other license violations such as the number of simultaneous users or unauthorized modifications.

If no rights violation events are detected (at STEP 312), processing returns to STEP 308. On the other hand, if an event is detected (at STEP 312), rights management component 170 saves the state information of software computer program 160 to, for example, data area 150 (STEP 316). In some embodiments, rights management component 170 may utilize a conventional SUSPEND TO DISC operation. In other embodiments, specific details determined, for example, by the operating specifics of rights management component 170 may be saved. For example, rights management component 170 may save those details and operating specifics of computer program 160 sufficient to resume the computer program. In other embodiments, rights management component 170 may save the state information of the entire platform (i.e., computing system 110). In these embodiments, the state of each component of computing system 100 may be saved. For example, rights management component 170 may save user interface parameters such as the video resolution of a display, the mouse speed, etc.

After saving the state information (STEP 316), rights management component 170 may disable computer program 160 (STEP 320). For example, rights management component 170 may terminate execution of computer program 160. In other embodiments, rights management component 170 may disable or terminate execution of the entire platform (i.e., computing system 100) or a portion of the platform. For example, rights management component 170 may shut down or restart computing system 100.

After execution of computer program 160 (or, for example, computing system 100) has been disabled, a user may attempt to resume operation (STEP 324). For example, the user may restart computer program 160 or reboot computing system 100. Whatever the case, upon resuming operation, rights management component 170 gains control of computing system 100 (STEP 328). Rights management component 170 then checks the status of any rights violation events for compliance (STEP 332). For example, rights management component 170 may check the expiration date of a license or test for more than the permitted number of simultaneous users. If no violations are detected, processing returns to STEP 308. If a violation is detected (STEP 336), rights management component may activate security component 180 (discussed below) (STEP 340) and/or terminate processing (STEP 344).

In other embodiments, rights management component 170 may activate security software (e.g., security component 180) immediately or shortly after saving any state information (STEP 320) before or instead of disabling computer program 160 and/or system 100. In these cases, a user is given an opportunity to address noncompliance before computer program 160 or computing system 100 is disabled.

Figure 4:
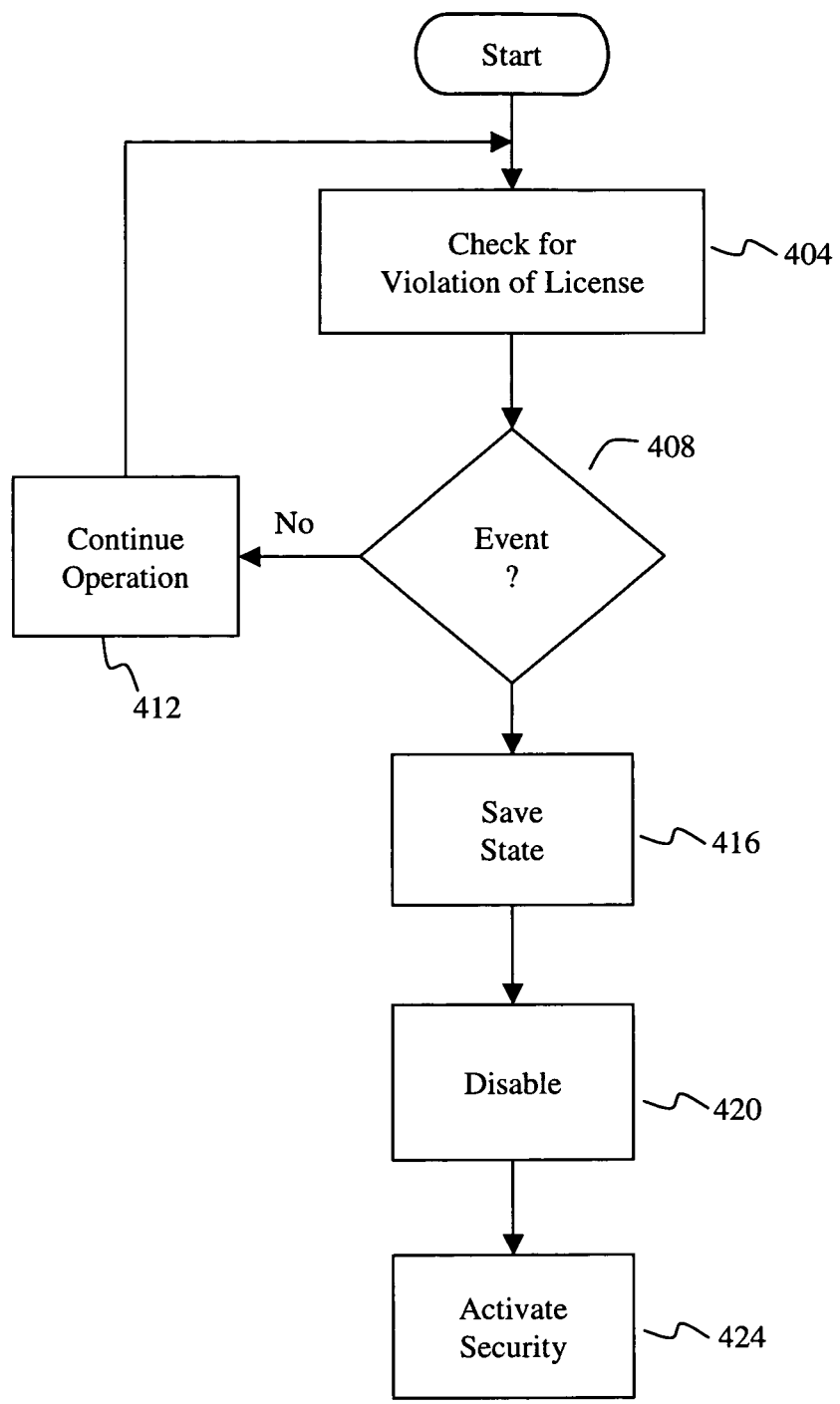
FIG. 4 depicts another example of a process utilizable for controlling operation of the rights management system of the present invention.

FIG. 4 depicts another example of a process utilizable for controlling operation of the rights management system of the present invention. In this embodiment, the rights management system starts processing by monitoring computer program 160 and/or computing system 100 for license violations (e.g., rights violation events) (STEP 404). As with the embodiment of FIG. 3, rights management component 170 may monitor for activities or use of computer program 160 beyond the term of the license.

If no license violation events are detected (at STEP 408), operation of the system continues (STEP 412) and processing returns to STEP 404.

On the other hand, if an event is detected (at STEP 408), rights management component 170 saves the state information of software computer program 160 to, for example, data area 150 (STEP 416). As with the above embodiment, rights management component 170 may save the details and operating specifics of computer program 160 and/or the state information of the entire platform (i.e., computing system 100).

Subsequent to saving the state information, rights management component 170 disables computer program 160 (STEP 420). For example, rights management component 170 may terminate execution of computer program 160 and/or disable or terminate execution of the entire platform (i.e., computing system 100) or a portion of the platform.

After disabling or terminating execution of computer program and/or computing system 100, rights management component 170 may, for example, activate a security component (STEP 424).

As discussed above, once a rights or license violation event has been detected and state information has been saved, security component 180 may be activated (e.g., STEPS 340 and 424). In particular, security component 180 may be activated to, for example, facilitate the renewal of a license. For instance, in some embodiments security component 180 may be implemented to prompt a user for a license key obtainable from a user manual or website and the like. Similarly, security component 180 may connect the user to an Internet site where a license may be renewed (e.g., after submitting renewal payment information). In other embodiments (e.g., in situations where a user does not wish to renew the license), security component 180 may facilitate the transfer of saved state information to the user via, for example, a storage device or medium and the like. Whatever the case, if security component 180 is used to renew the license terms or otherwise returns use of computer program 160 to compliance, computer program 160 may be reactivated or utilized without triggering rights management component 170 (e.g., STEP 320).

The rights management of the present invention may be implemented in a variety of forms, such as in software or firmware, running on a general purpose computer or a specialized device. The code can be provided in any machine-readable medium, including magnetic or optical disk, or in memory. Furthermore, the present invention is utilizable in conjunction with a computer system that operates software which may require periodic updates, as well as with any operating system (e.g., Linux, Unix, MS Windows, MacOS, etc.).

While there have been shown and described examples of the present invention, it will be readily apparent to those skilled in the art that various changes and modifications may be made without departing from the scope of the invention as defined by the following claims.

What is claimed is:

1. A method of controlling use of an operating system, said method comprising the steps of:
    monitoring usage of an operating system of a computer for at least one instance of a rights violation event, said monitoring being conducted by a rights manager located on the computer;
    determining, by said rights manager, whether a rights violation has occurred based on licensing expiration information received by said rights manager from the operating system;
    saving, upon detection of said rights violation event, state information of said operating system, wherein the state information includes content sufficient to commence operation of the operating system at the current state, without loss of user input provided or operating system processing accomplished prior to said rights violation event; and
    suspending, upon saving said state information, operation of said operating system; and,
    resuming, upon resolution of the rights violation event, operation of said operating system at the current state using the saved state information.

2. The method of claim 1, further comprising:
    monitoring, upon an attempt to reactivate said operating system, for a current instance of a rights violation event; and maintaining suspension of said operating system when a current instance of a rights violation event has been detected and terminating suspension of said operating system when no current instance of a rights violation event has been detected.

3. The method of claim 1, further comprising transferring said state information to a memory medium after suspending operation of said operating system.

4. The method of claim 1, further comprising:
    prompting for a license key to be entered; and terminating suspension of said operating system when said license key is entered.

5. The method of claim 1, further comprising:
    prompting for payment information; and
    terminating suspension of said operating system when said payment information is entered.

6. The method of claim 1, wherein saving state information includes performing a suspend to disc operation.

7. A method of controlling use of an operating system, operating as part of a computer system, said method comprising the steps of:
    monitoring, by a rights manager, usage of an operating system of a computer for a violation of one or more requirements for use of said operating system, said rights manager being located on the computer;
    determining, by said rights manager, whether a rights violation has occurred based on licensing expiration information received by said rights manager from the operating system;
    saving, upon detection of a violation of one or more requirements, state information of said operating system, wherein the state information includes content sufficient to commence operation of the operating system at the current state, without loss of user input provided or operating system processing accomplished prior to said rights violation event;
    suspending, upon saving said state information, operation of said operating system and/or at least a portion of said computer system; and
    maintaining suspension of said operating system and/or at least a portion of said computer system while said usage continues to violate one or more requirements and terminating the suspension of said operating system and/or at least a portion of said computer system when said usage complies with said requirements; and,
    resuming, upon resolution of the rights violation event, operation of said operating system at the current state using the saved state information.

8. The method of claim 7, wherein said saving state information includes performing a suspend to disc operation.

9. A computer program product, residing on a non-transitory computer-readable medium, for use in controlling use of an operating system, said computer program product comprising instructions for causing a computer system to:
   monitor usage of an operating system of a computer for at least one instance of a rights violation event, the usage being monitored by a rights manager located on the computer;
   determine, by said rights manager, whether a rights violation has occurred based on licensing expiration information received by said rights manager from the operating system;
   save, upon detection of said rights violation event, state information of said operating system, wherein the state information includes content sufficient to commence operation of the operating system at the current state, without loss of user input provided or operating system processing accomplished prior to said rights violation event; and
   suspend, upon saving said state information, operation of said operating system and/or at least a portion of said computer system; and,
   resuming, upon resolution of the rights violation event, operation of said operating system at the current state using the saved state information.

10. The computer program product of claim 9, further comprising instructions for causing said computer system to:
   monitor, upon an attempt to reactivate said operating system, for a current instance of a rights violation event; and
   maintain suspension of said operating system and/or at least a portion of said computer system when a current instance of a rights violation event has been detected and terminate suspension of said operating system and/or at least a portion of said computer system when no current instance of a rights violation event has been detected.

11. The computer program product of claim 9, further comprising instructions for causing said computer system to transfer said state information to a memory medium after suspending operation of said operating system.

12. Computer program product of claim 9, further comprising instructions for causing said computer system to:
   prompt for a license key to be entered; and
   terminate suspension of said operating system when said license key is entered.

13. The computer program product of claim 9, further comprising instructions for causing said computer system to:
   prompt for payment information; and
   terminate suspension of said operating system when said payment information is entered.

14. The computer program product of claim 9, wherein said instructions for causing a computer system to save state information includes instructions for performing a suspend to disc operation.

15. A computer system of controlling use of an operating system, said computer system comprising:
   a processing unit;
   a memory device storing instructions for execution by the processing unit;
   wherein the processing unit executes the stored instructions to:
   monitor usage of an operating system of a computer for a rights violation event, the usage being monitored by a rights manager located on the computer;
   determining, by said rights manager, whether a rights violation has occurred based on licensing expiration information received by said rights manager from the operating system;
   save, upon detection of said rights violation event, state information pertaining to a current state of said operating system, wherein the state information includes content sufficient to commence operation of the operating system at the current state, without loss of user input provided or operating system processing accomplished prior to said rights violation event; and
   suspend, upon saving said state information, operation of said operating system and/or at least a portion of said computer system; and,
   resume, upon resolution of the rights violation event, operation of said operating system at the current state using the saved state information.

16. The system of claim 15, wherein the processing unit further executes the stored instructions to:
   monitor, upon an attempt to reactivate said operating system, for a current instance of a rights violation event;
   maintain suspension of said operating system and/or at least a portion of said computer system when a current instance of a rights violation event has been detected; and
   terminate suspension of said operating system and/or at least a portion of said computer system when no current instance of a rights violation event has been detected.

17. The system of claim 15, wherein the processing unit further executes the stored instructions to transfer said state information to a memory medium after suspending operation of said operating system.

18. The system of claim 15, wherein the processing unit further executes the stored instructions to:
   prompt for a license key to be entered; and
   terminate suspension of said operating system when said license key is entered.

19. The system of claim 15, wherein the processing unit further executes the stored instructions to:
   prompt for payment information; and
   terminate suspension of said operating system when said payment information is entered.

20. The system of claim 15, wherein said save of state information includes a suspend to disc operation.

* * * * *